United States Patent [19]

Yoshida et al.

[11] Patent Number: 5,075,783

[45] Date of Patent: Dec. 24, 1991

[54] FACSIMILE APPARATUS AND FACSIMILE COMMUNICATION METHOD

[75] Inventors: Takehiro Yoshida; Susumu Matsuzaki, both of Tokyo; Takashi Ono, Yokosuka, all of Japan

[73] Assignee: Canon Kabushiki Kaisha, Tokyo, Japan

[21] Appl. No.: 337,152

[22] Filed: Apr. 12, 1989

[30] Foreign Application Priority Data

Apr. 20, 1988 [JP] Japan .................................. 63-97926

[51] Int. Cl.$^5$ .............................................. H04N 1/00
[52] U.S. Cl. .................................... 358/439; 358/449; 358/498; 358/434
[58] Field of Search ............... 358/449, 498, 434, 438, 358/436, 439

[56] References Cited

U.S. PATENT DOCUMENTS

| | | | |
|---|---|---|---|
| 4,432,020 | 2/1984 | Onose et al. | 358/434 |
| 4,613,907 | 9/1986 | Ysohimoto et al. | 358/439 |
| 4,679,093 | 7/1987 | Yaguchi | 358/257 |
| 4,695,898 | 4/1987 | Ishikawa et al. | 358/449 |
| 4,712,139 | 12/1987 | Kato | 358/257 |
| 4,717,967 | 1/1988 | Yoshida | 358/296 |

FOREIGN PATENT DOCUMENTS 58-29261  2/1983  Japan .................................. 358/439

*Primary Examiner*—Edward L. Coles, Sr.
*Attorney, Agent, or Firm*—Fitzpatrick, Cella, Harper & Scinto

[57] ABSTRACT

A facsimile apparatus which transmits original image data separately in accordance with size of receiving sheets at a receiving station includes a receiving page counter for counting the number of the receiving sheets on which the original image data is reproduced, and data corresponding to count value of the page counter is transmitted to the receiving station.

15 Claims, 14 Drawing Sheets

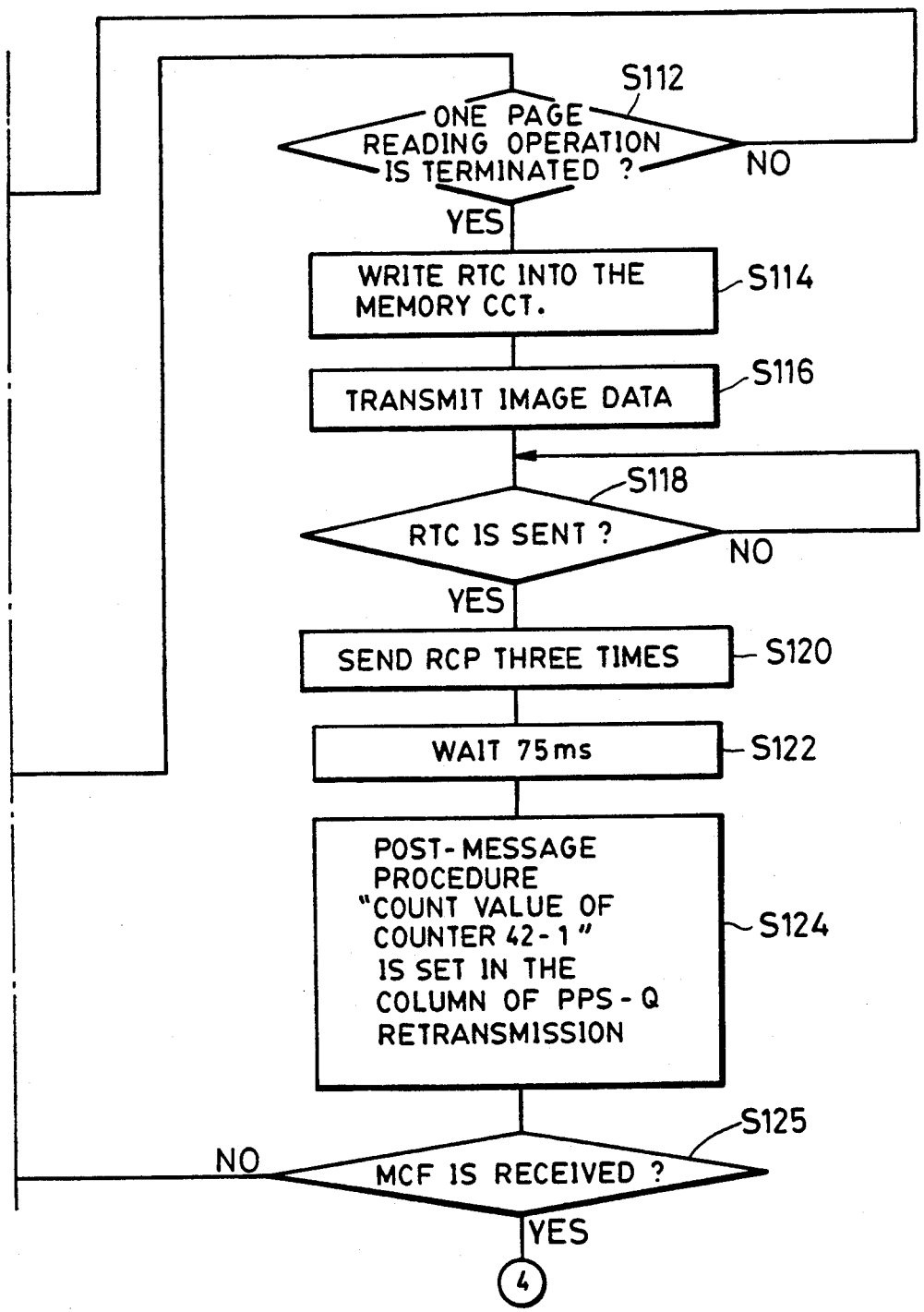

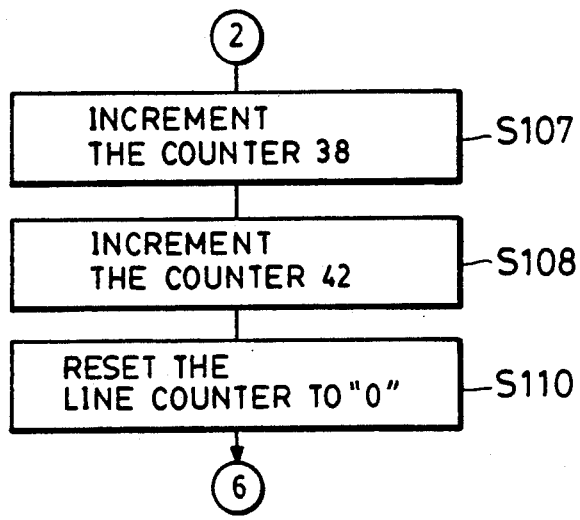
FIG. 2 (3)
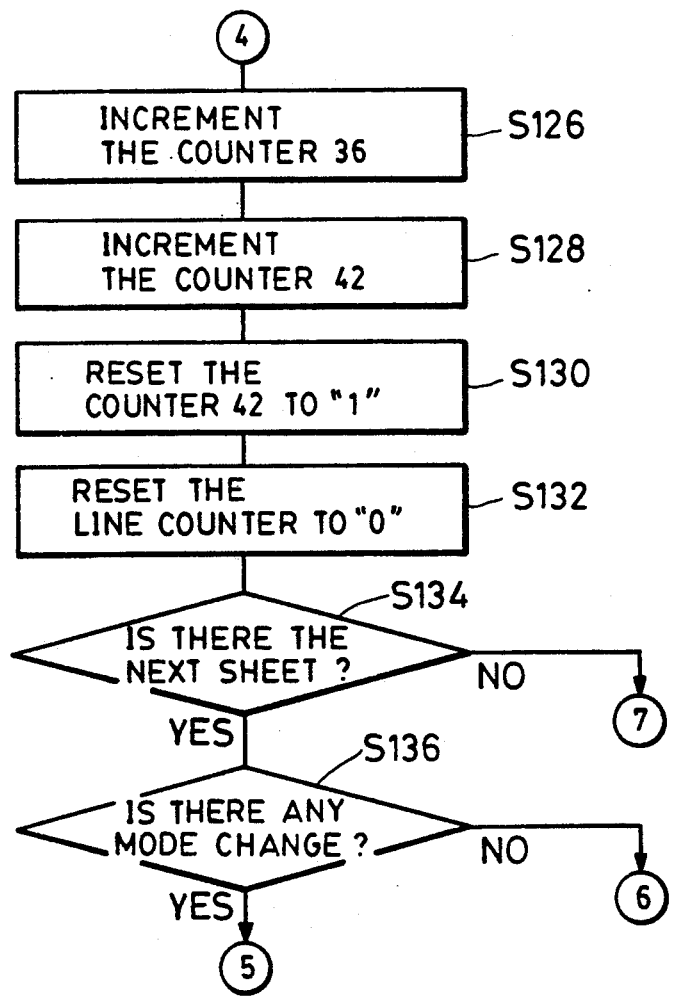
FIG. 2 (4)

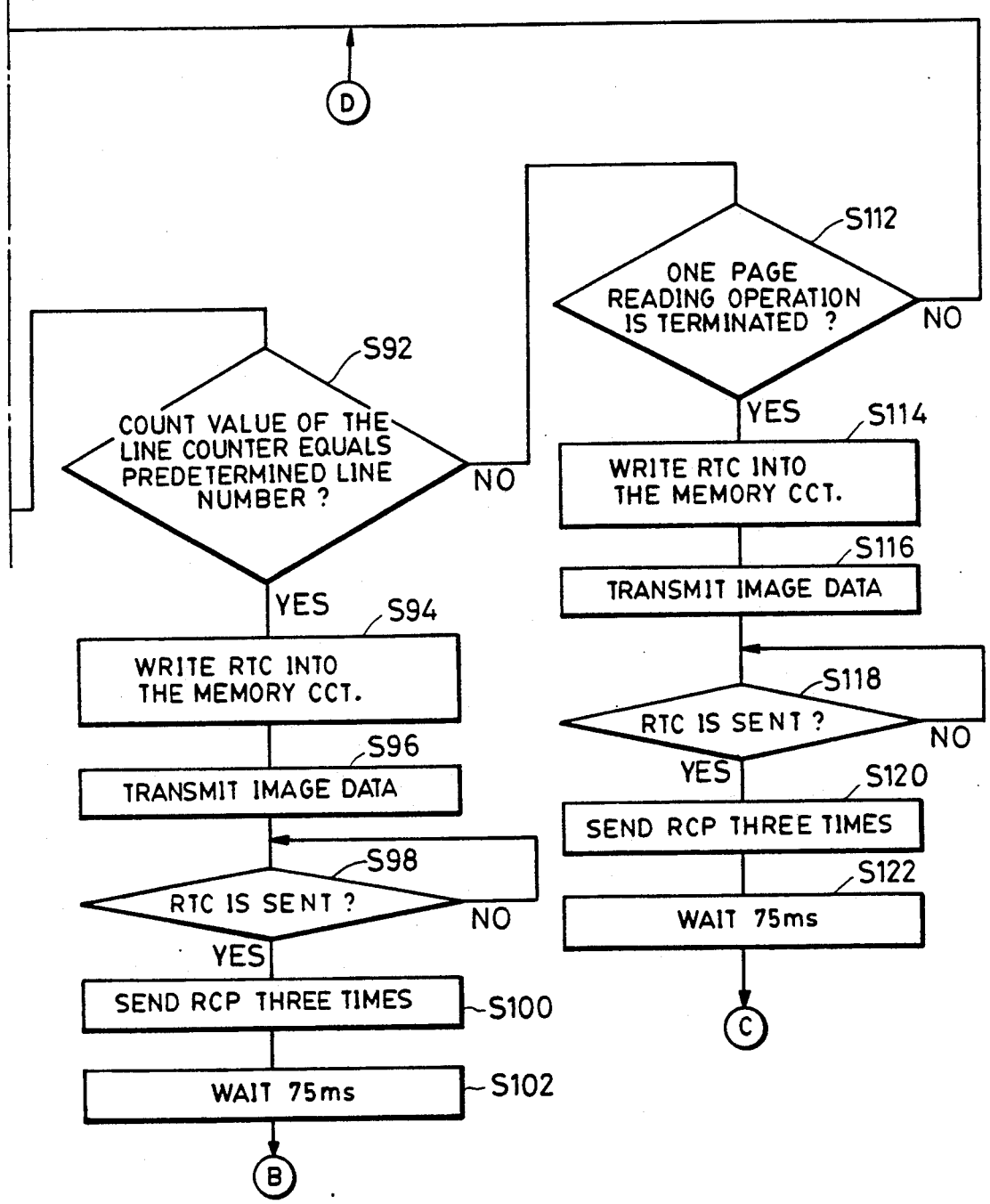

FIG. 4 (3)
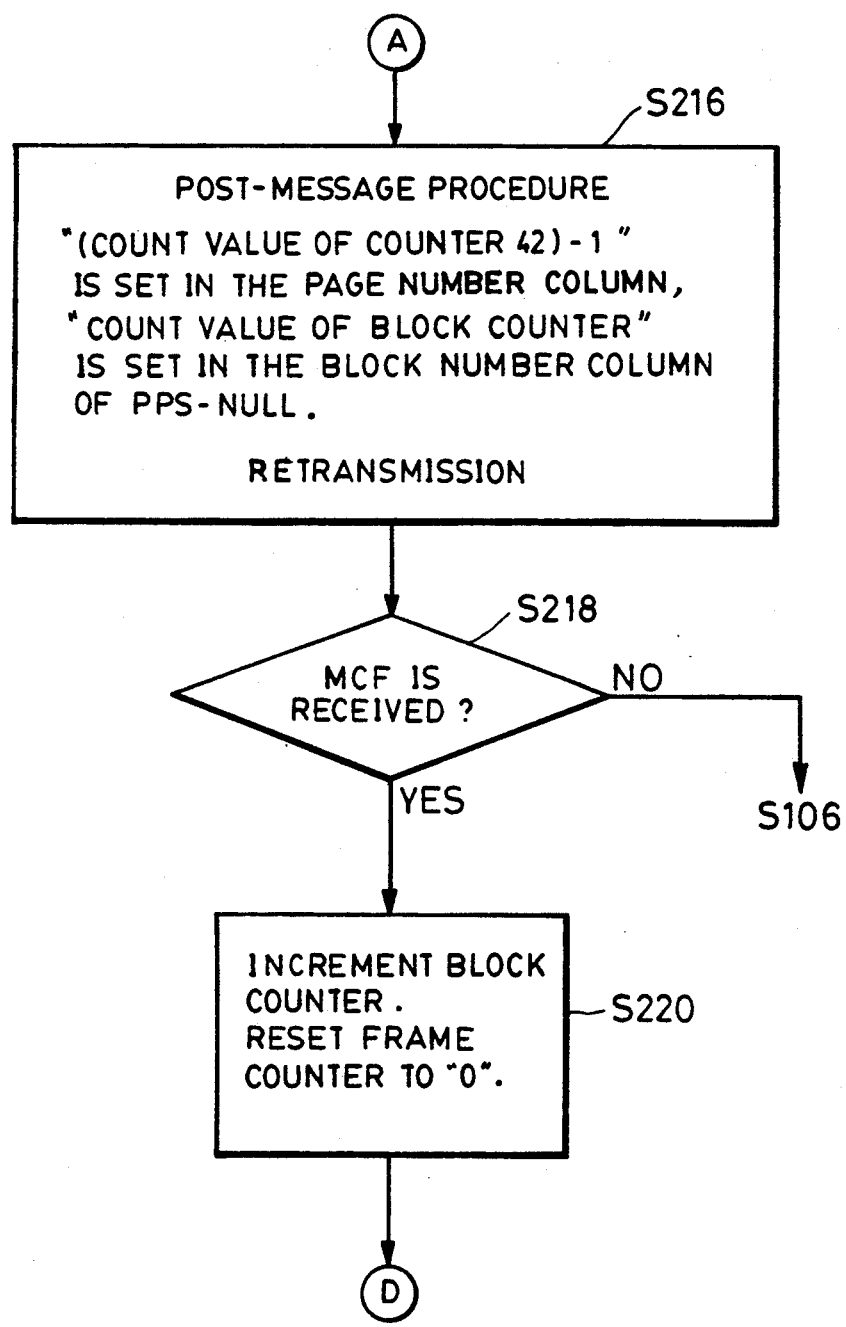

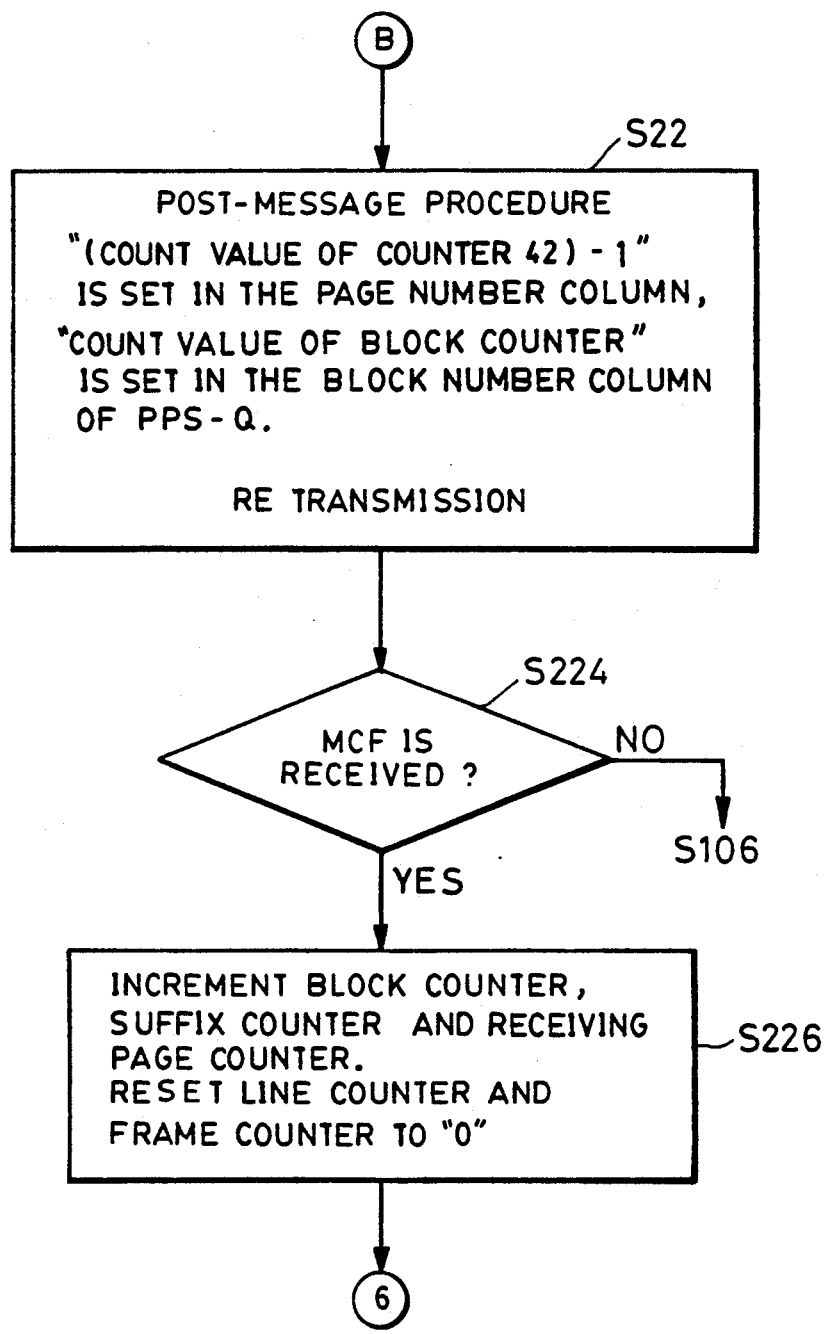
FIG. 4 (4)

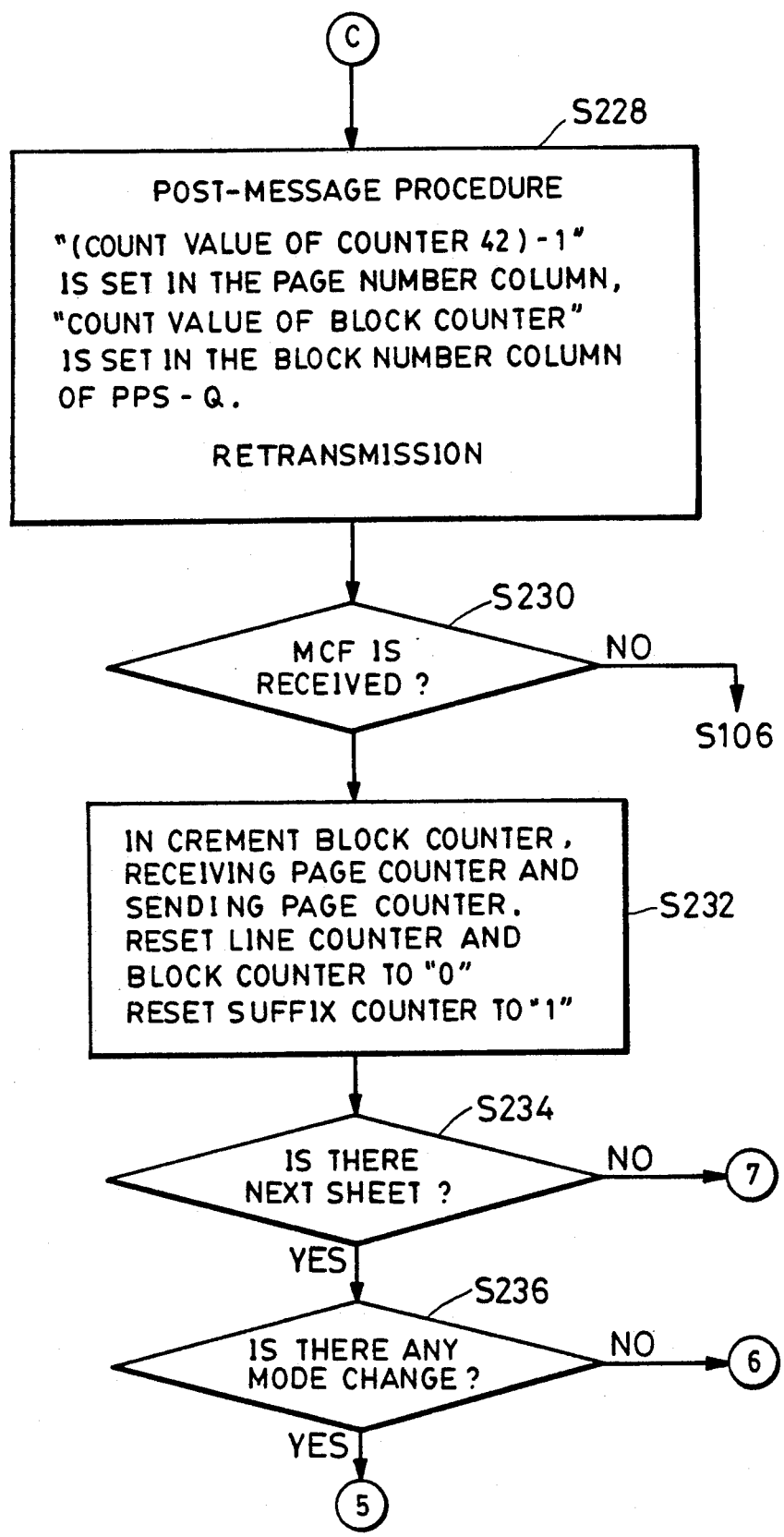
FIG. 4 (5)

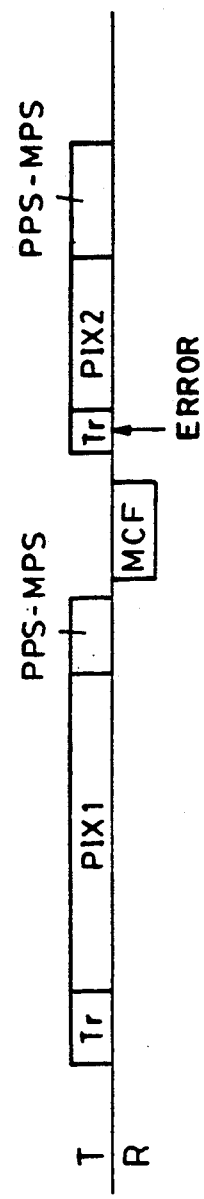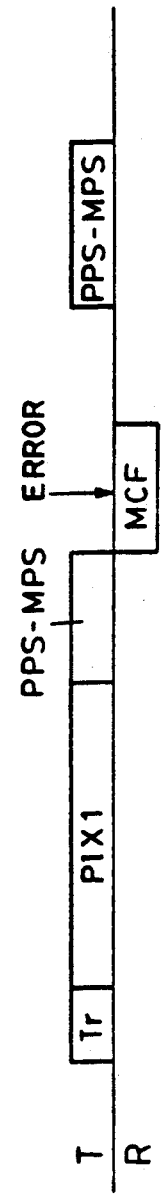
FIG. 5(A)
FIG. 5(B)

FACSIMILE APPARATUS AND FACSIMILE COMMUNICATION METHOD

BACKGROUND OF THE INVENTION

1. Field of the Invention

The present invention relates to a facsimile apparatus and a facsimile communication method, and more especially relates to a facsimile apparatus and facsimile communication method which can send long original documents to a destination apparatus which has cut sheets of predetermined size to record the received image information thereon.

2. Related Art

One conventional facsimile apparatus has a counter circuit for counting the number of original sheets to be sent.

A count value of the counter circuit is incremented whenever each original sheet is read by the facsimile apparatus. The facsimile apparatus writes the count value at the top position of the image information of the corresponding original sheet as identification information of the sending station. The top position is called "the column of identification of the sending apparatus". The image information including the identification information having the count value is sent to the destination side. Then, the destination apparatus records the image information including the count value, which is recorded on the top of the recording sheet, and the operator of the destination side recognizes the page number of the received image information.

If the destination facsimile apparatus has predetermined size cut sheets as recording material and the transmitting facsimile apparatus sends an original image longer than the predetermined size cut sheets of the destination facsimile apparatus, the original image should be reproduced on a plurality of receiving sheets separately.

In such a case, the "column of identification of sending apparatus" is on the top of each original image corresponding to each original document page. Therefore the page information will be recorded on the first cut sheet at the destination facsimile, but on the succeeding cut sheet there will be no page information.

Thus, the conventional facsimile apparatus counts only the original document pages during transmission, so that the receiving facsimile apparatus can not record the correct page number of the original document on the cut sheets on which the original image is reproduced. Therefore, after transmission, a negotiation between the sending and receiving sides regarding the sent document will be in discord, because the original document page numbers of the sending side differ from the cut sheet numbers of the receiving side.

Further, if an error occurs during transmission, it is not easy for the receiving side to discriminate which page of information is in error because of the above mentioned reason. Hence, the image information of a page not in error could be sent twice, or the image information of a page between two pages not in error could be lacking.

For example, in an error correction mode, which is explained afterward, the following case can be considered.

In FIG. 5A, after a transmitting station T sends training signal Tr, image signal PIX1 is transmitted, and then a post-message command for a partial page PPS-MPS is transmitted.

If a receiving station R receives all of image signal PIX1 correctly, the receiving station R transmits a confirmation signal MCF representing correct reception to the transmitting station T. Then, the transmitting station T transmits the next image signal PIX2 following training signal Tr. The transmitting station T transmits a post-message command PPS-MPS following the image signal PIX2.

In the case when the training signal TR before the image signal PIX2 is not transmitted correctly to the receiving station, the receiving station cannot receive the image signal PIX2 at all and receives only the post-message command PPS-MPS.

On the other hand, in the case of FIG. 5B, if the transmitting station T does not receive the confirmation signal MCF from the receiving station R, the transmitting station T retransmits the post-message command PPS-MPS.

Thus, the receiving station R can not recognize whether the command PPS-MPS belongs to the image signal PIX2 as shown in FIG. 5A or the image signal PIX1 as shown in FIG. 5B. If the command PPS-MPS includes page information and the pages of image signals PIX1 and PIX2 are different, the receiving station might be able to discriminate which image signal the command PPS-MPS belongs to.

However, if the image signals PIX1 and PIX2 are from the same sending original sheet and are separately transmitted, e.g., if the receiving station has only cut sheets and the image signal PIX1 is for the first cut sheet and the image signal PIX2 is for the second cut sheet, the receiving station cannot recognize which image signal the command PPS-MPS belongs to even if the command PPS-MPS includes the page information.

Thus, in the case as shown in FIG. 5A, the image signal PIX2 might be lacking from the received information.

SUMMARY OF THE INVENTION

A purpose of the present invention is to provide a facsimile apparatus and a facsimile communication method which overcomes the above-mentioned shortcomings.

One aspect of the present invention provides a facsimile apparatus which can correctly administrate the page number, and enables a receiving apparatus to record the correct number on receiving cut sheets, even if a long original document is sent to the receiving station which has only predetermined size cut sheets as recording material.

A facsimile apparatus of the present invention includes a first counter for counting the number of sending original documents and a second counter for counting the number of recorded cut sheets. The second counter counts the actual page numbers of recorded cut sheets of the receiving side, so that the actual page numbers can be recorded on the cut sheets even if a long document is sent to a receiving station which uses or has only predetermined size cut sheets.

A facsimile apparatus in another aspect of the present invention includes a receiving page counter for counting the number of receiving sheets and receiving page data sending means for sending count data corresponding to the count value of the counter to a receiving station. Thus, the receiving station can recognize how many pages of receiving sheets the transmitting apparatus transmits.

Another aspect of the present invention provides a facsimile communication method having a retransmission function which retransmits image data in response to a requirement from a receiving station after transmission of image data. In this facsimile communication method, the image data is transmitted separately according to a size of cut sheets at the receiving station and, to each end of an original sheet, a different identification code for every separated original image data is sent, and the receiving station administrates the retransmission based on the different identification code.

The foregoing summary of certain advantageous features of the invention is provided in order that the following detailed description of the preferred embodiments thereof may be better understood, and in order that the present contribution to the art may be better appreciated. There are, of course, additional features of the invention that will be described in the detailed description with reference to the accompanying drawings. Those skilled in the art will appreciate that the conception upon which this disclosure is based may readily be utilized as a basis for designing other structures or methods for carrying out the purposes of the invention. It will be understood that the claims are to be regarded as including such other constructions and methods as do not depart from the spirit and scope of the invention.

DETAILED DESCRIPTION OF THE PREFERRED EMBODIMENT

Figure 1:
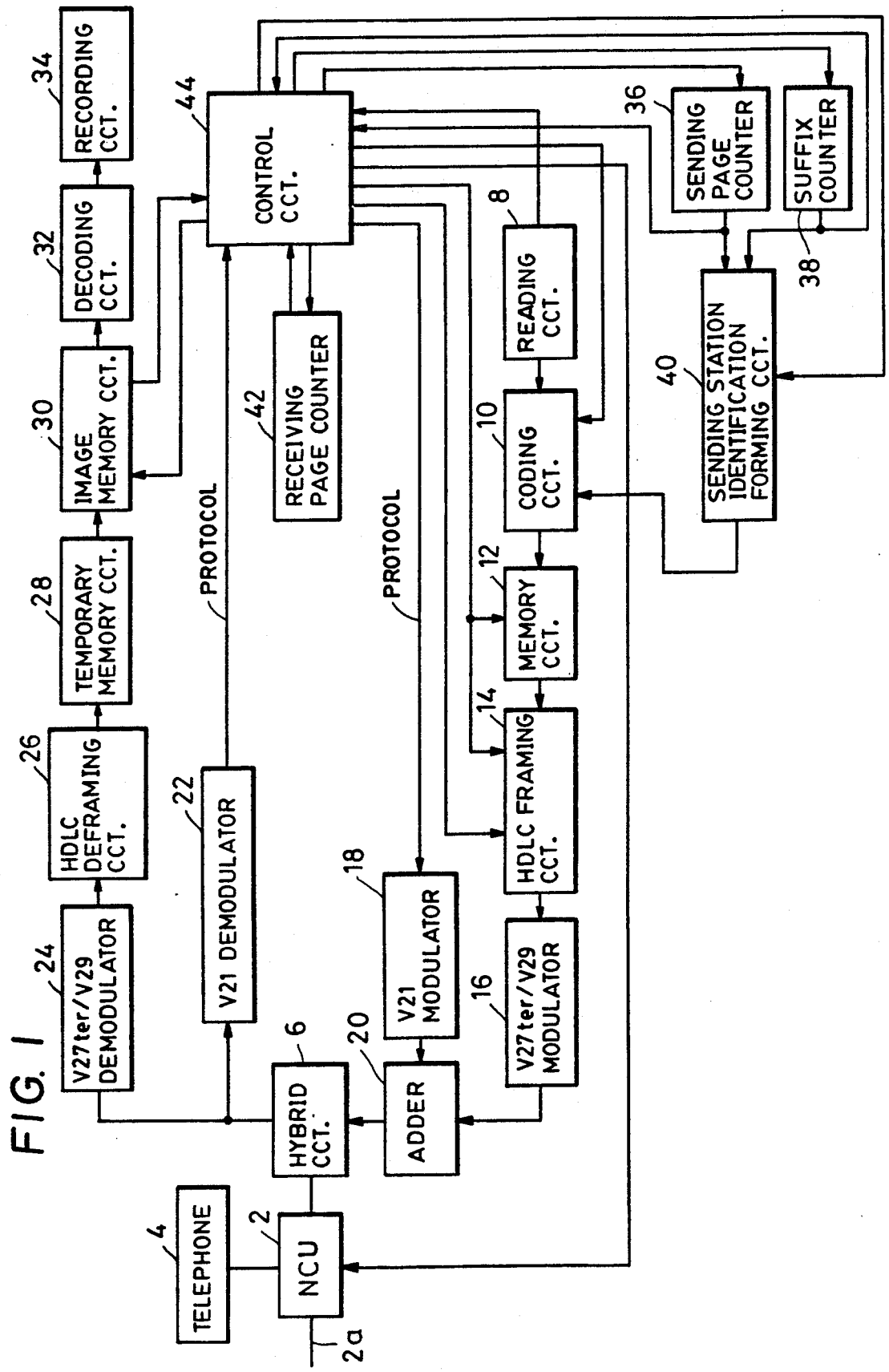
FIG. 1 is a block diagram showing a facsimile apparatus in a first embodiment of the present invention.

A facsimile apparatus in a first embodiment of the present invention shown in FIG. 1 is structured to be able to select transmitting and receiving procedures in an error correction mode (ECM) which is explained as follows. In transmission in the ECM, image data of an original document is sent in units of one block. Each block has a predetermined number of frames, and each frame has a predetermined amount of image data. After transmission of the block, a receiving station informs a sending station of erroneous frames whose image data was sent incorrectly or in which an error occurred. Then the sending station retransmits the image data in the erroneous frames which were identified from the receiving station. For every transmission of one block, a protocol communication is established in the ECM. In the protocol communication, the sending station sends a page number to the receiving station at a page number column of post message commands (PMC).

The maximum size of the block is predetermined, and a size of each image memory of the sending station and the receiving station is set in accordance with the maximum size of the block. The amount of image information is variable in accordance with kinds of original information.

In this embodiment, however, it is presumed that the amount of image information in an original document corresponding to a predetermined size cut sheet which is used as recording material at the receiving station does not exceed the maximum size of the block, and all the image data corresponding to the cut sheet at the receiving station is transmitted as a unit.

The facsimile apparatus of this embodiment has three counters 36, 38, 42.

The actual sending page counter 36 counts the number actual pages of the sending original document. The counter 36 is incremented every sheet of the sending original document irrespective of its length.

The suffix counter 38 counts the page number of cut sheets corresponding to one actual sending original sheet. For example, if the sending original sheet is longer than the cut sheet of the receiving station, a plurality of cut sheets are output for the one sending original sheet. The suffix counter 38 counts the number of the cut sheets for one sending original sheet. In other words, the suffix counter 38 is incremented for every transmission of one block during sending one original sheet, and the suffix counter 38 is reset every time the number of sending original sheets is incremented by the counter 36.

The actual receiving page counter 42 counts the number of total output cut sheets at the received station during each transmission between established stations. In this embodiment, each output cut sheet corresponds to each block of image data, and therefore the counter 42 is incremented for every transmission of one block. In the case that image data of the long original sheets is sent to the receiving station, the actual page number of the sending original sheets counted by the counter 36 is recorded on each cut sheet. Further, in addition to the actual page number, the suffix page number of output cut sheets corresponding to one sending original sheet counted by the suffix counter 38 is also printed on each cut sheet. Thus the actual page number of sending original sheets and the suffix page number of output cut sheets per one sending original sheet are displayed on each cut sheet at the receiving station.

In the error correction mode, the receiving page number based on the count value of the counter 42 is set in the page number column of the post message commands (PMC), and is sent to receiving station. Thereby, even if the image data of a long original document is sent to the receiving station which has only cut sheets as recording material, the continuous page numbers can be set in the page number column, and communication of normal commands can be maintained during transmission.

The structure of the facsimile apparatus of this embodiment is explained as follows. An NCU (Network Control Unit) 2 is provided for using a telephone network for data and other communication. The NCU 2 connects a telephone line 2a to the facsimile terminal, controls connection between the telephone line 2a and a telephone 4 or a hybrid circuit 6, and maintains a closed loop. The NCU 2 connects the telephone line 2a to the telephone 4 when the signal level of a signal line from a control circuit 44 is "0". On the other hand when the signal level of the signal line from the control circuit 44 is "1", the NCU 2 connects the telephone line 2a to the facsimile terminal, which is constituted by all the elements in FIG. 1 except the NCU 2 and the telephone 4. In normal condition or initial condition, the telephone line 2a is connected to the telephone 4.

The hybrid circuit 6 is provided for separating the transmitting signal and receiving signal. In other words, the hybrid circuit 6 sends the transmitting signal from an adder 20 to the telephone line 2a via the NCU 2, and transfers the receiving signal from another station via the NCU 2 to a V29 demodulator 24 and a V21 demodulator 22.

A reading circuit 8 is provided for reading image information of the original document line by line of main scanning, and for outputting signals having two values: white and black. The reading circuit 8 is structured with an imaging device such as a CCD (Charge Coupled Device), an optical system and so on. Further the reading circuit 8 has a sensor for detecting a next original sheet to be sent, and provides information whether the next original sheet exists or not to the control circuit 44.

A coding circuit 10 is also provided for coding image information read by the reading circuit 8. A MH (Modified Huffman) coding method or a MR (Modified READ) coding method is advantageously used by the coding circuit 10.

A memory circuit 12 is provided for temporarily storing image data coded and output from the coding circuit 10. In this embodiment, as described above, each block having a plurality of frames of image data is transmitted as a unit. When error occurs during transmission, the image data can be retransmitted. Thus, the memory circuit 12 is structured to store a maximum of image data of one block. The memory circuit 12 is also structured to output image data only in frames, which is designated by the control circuit 44 with a frame designating signal (bit map information) during retransmission.

A framing circuit 14 is provided for making an HDLC format signal by "0" insertion and adding an address field signal, control field signal, FCF (Facsimile Control Field signal), frame number information at the top of the coded image data, etc. The framing circuit 14 outputs continuous flags when the signal level of a flag output command signal from control circuit 44 becomes "1". These flags are used for a flow control procedure in the transmitting station.

A V27ter/v29 modulator 16 is provided for modulating image data based on V27ter (differential phase modulation) or V29 (*orthogonal* modulation) recommendation of CCITT.

A V21 modulator 18 is provided for modulating protocol signals from the control circuit 44. The modulator 28 modulates signals based on the V21 recommendation of CCITT. The adder 20 is provided for adding outputs of the modulator 16 and 18.

A V21 demodulator 22 is provided for demodulating protocol signals based on the V21 recommendation of CCITT.

A V27ter/V29 demodulator 24 is provided for demodulating a received data signal based on the recommendation V27ter/V29 of CCITT.

A deframing circuit 26 is provided for deframing the demodulated HDLC format data signal from the demodulator 24, for providing "0" deletion, and for reproducing the image data as it was before the framing HDLC format.

A temporary memory circuit 28 is provided for temporarily storing coded image data in a unit of one frame. The image data which is received correctly is output from the temporary memory circuit 28.

The image memory circuit 30 is provided for storing frame image data output from the temporary memory circuit 28 into an applicable area. The image memory circuit 30 has memory space enough to store at least one block of image data. The image memory circuit 30 outputs the image data until the last frame where there is no error to a decoding circuit 32 sequentially. The image memory circuit 30 also outputs data of numbers of received frames to the control circuit 44. All contents of the image memory circuit 30 are reset to "0" by a clear pulse from the control circuit 44.

The decoding circuit 32 is provided for decoding (MH decoding or MR decoding) demodulated image data from the image memory circuit 30.

The recording circuit 34 is provided for recording decoded white and black signals from the decoding circuit 32 on a recording material sequentially and line by line.

The actual sending page counter 36 is provided for counting the number of actual sending pages. The counter 36 is incremented by an increment pulse from the control circuit 44. The increment pulse is output every time image data of each actual sending sheet is finished being transmitted. The count value of the counter 36 is supplied to a sending station identification forming circuit 40. The count value of the counter 36 is reset by a clear pulse from the control circuit 44 when every sending procedure is terminated.

The suffix counter 38 is used when image data of one original sending sheet is separately reproduced on a plurality of cut sheets at the receiving station, and functions effectively when image data of long original sending sheets is sent. The counter 38 is incremented by an increment pulse which is output from the control circuit 44 every time the image data corresponds to an amount of one cut sheet at the receiving side, and counts the number of cut sheets per one actual sending sheet. The counter 38 is reset whenever the number of the actual sending page is incremented. The count value of the counter 38 is supplied to the identification forming circuit 40.

The sending station identification forming circuit 40 is provided for inputting the count value N (N is an integer) of the actual sending page counter 36 and the count value M (M is an integer) of the suffix counter 38, and for forming or outputting station identification information as line image information which shows the actual sending page number with a suffix showing the number of the receiving cut sheet for each sending page, e.g. "PN-M".

The counter 42 is provided for counting actual receiving cut sheets. The counter 42 is incremented by an increment pulse which is output from the control circuit 44 every time the image data corresponding to the amount of one cut sheet at the receiving station is finished being transmitted. The count value of the counter 42 is supplied to the control circuit 44, and is reset by a clear pulse from the control circuit 44 when every sending procedure is terminated.

The control circuit 44 is provided for controlling all circuits mentioned above and the total system of this facsimile apparatus, and is structured with a CPU, memories, and other conventional elements.

The operation of this embodiment is explained as follows.

Figure 2:
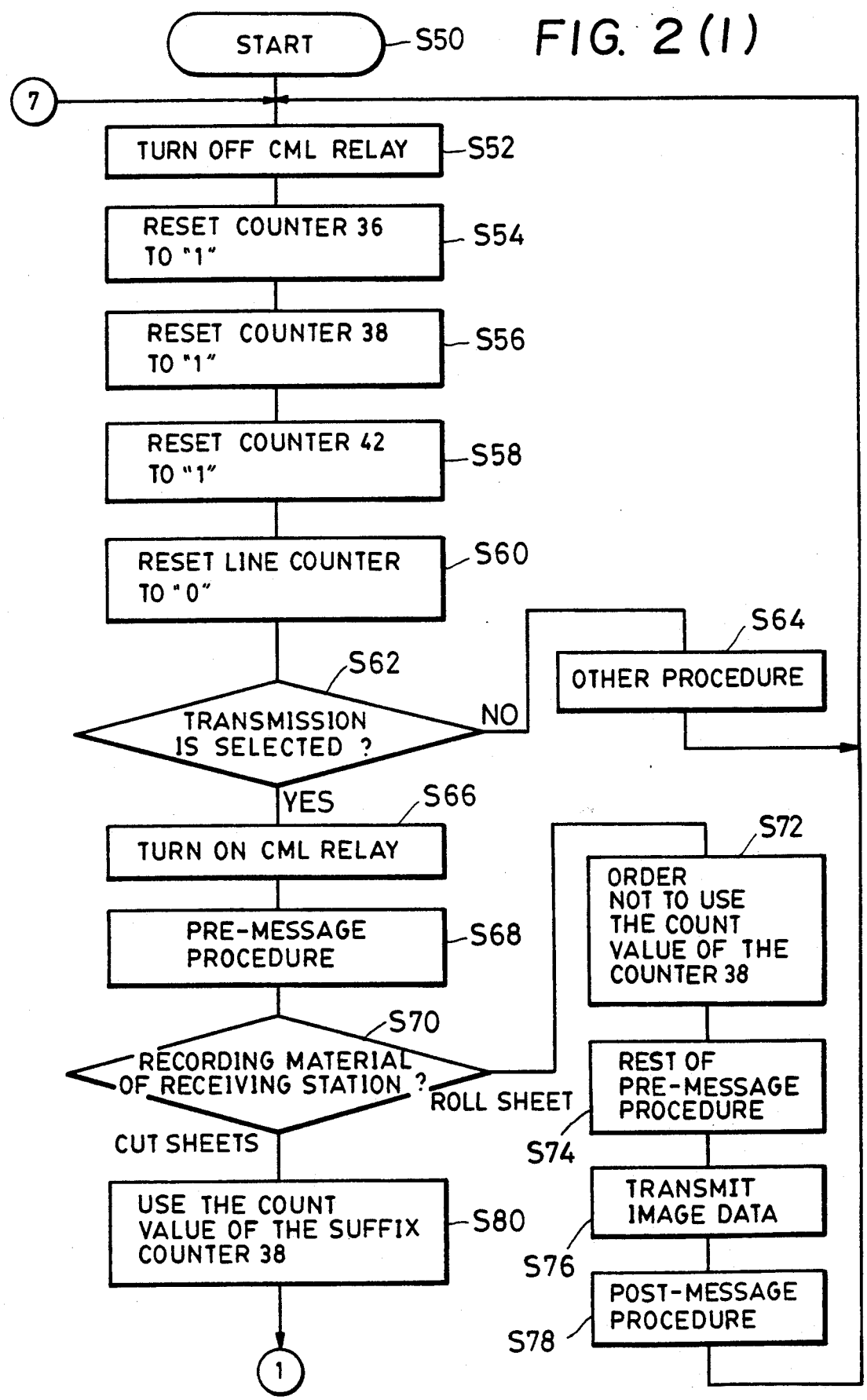
FIGS. 2(1) through 2(5) are flow charts illustrating control operations of a control circuit in FIG. 1.
Figure 2:
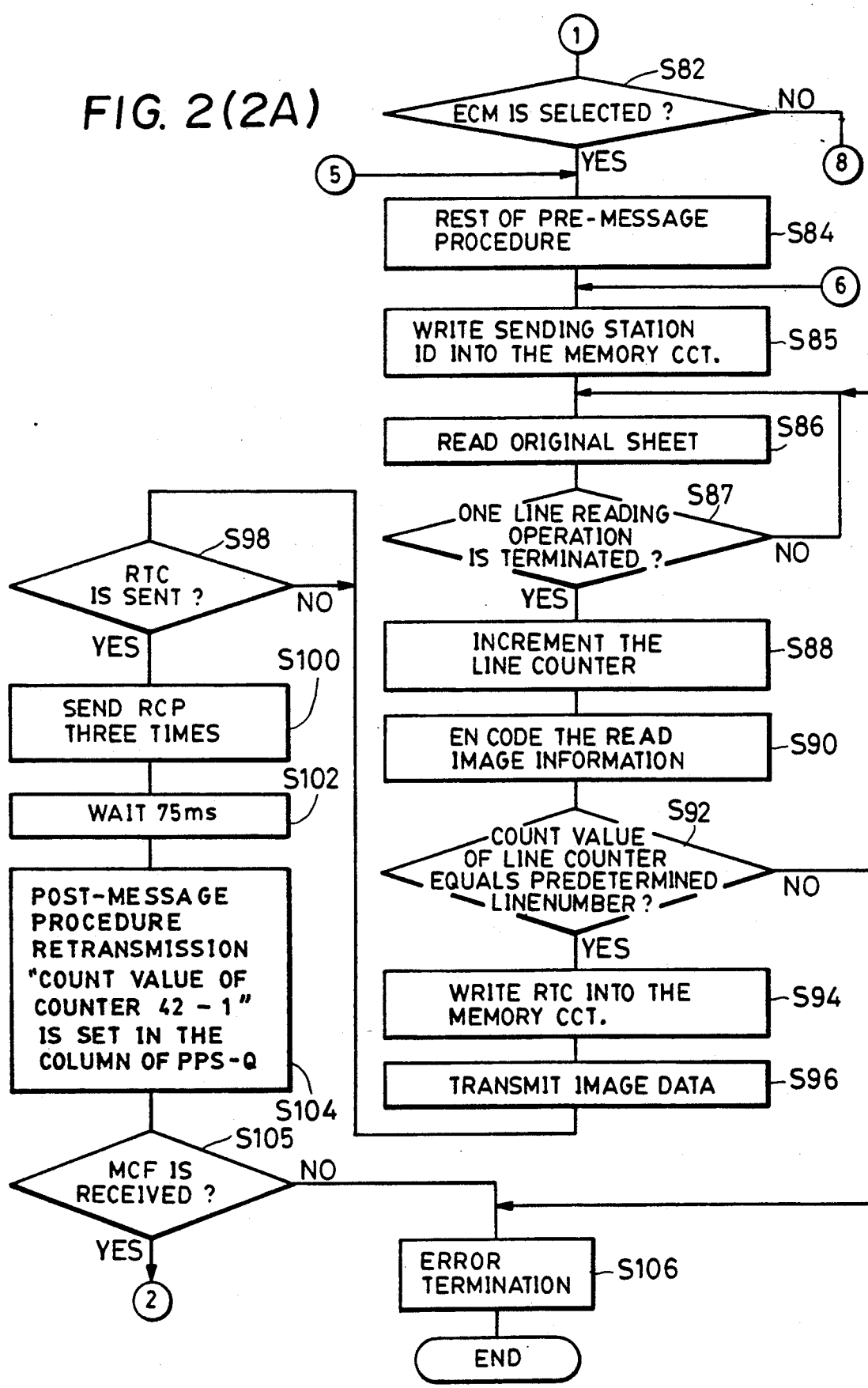
Figure 2:
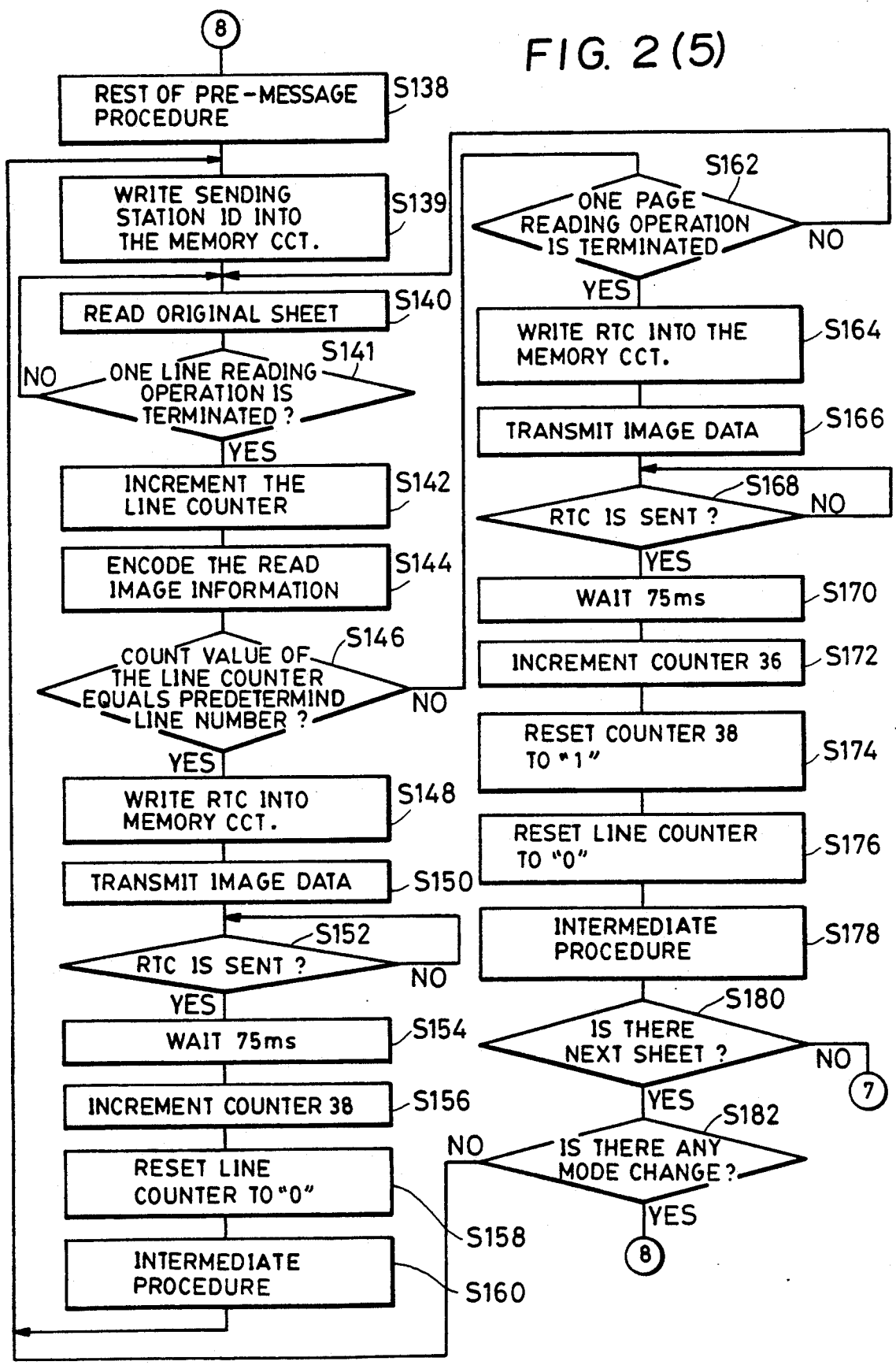

FIGS. 2(1) through 2(5) are flow-charts showing a method of controlling processes by the control circuit 44.

The control circuit 44 initializes the NCU 2 to connect the telephone line 2a to the telephone 4. In other words, after the process starts (S50), the control circuit 44 outputs the signal whose level is "0" to turn off a CML relay (S52).

The control circuit 44 initializes the counter circuits 36, 38 and 42 to set the count values thereof to "1" by outputting clear pulses (S54,S56,S58).

The control circuit 44 also initializes a line counter (not shown) to set its count value to "0" (S60). The line counter counts the number of lines of the sending original document which are read by the reading circuit 8. The count value of the line counter is used for determining the image data corresponding to amount of one actual receiving cut sheet in accordance with the size of cut sheets at the receiving side.

In step S62, after the initialization of counters, it is discriminated whether transmission is selected or not.

In the case where transmission is not selected, other procedures proceed from a standby state, which may be waiting for facsimile transmission, receiving or some other state (S64).

When facsimile transmission is selected the control circuit 44 outputs a signal at level "1" to the NCU2 to turn on the CML relay (S66). In a step S68, pre-message procedures are prosecuted. In step S70, it is discriminated whether the receiving station reproduces the sent image on a roll sheet or on cut sheets (S70). This discrimination is prosecuted by reading the 19th and 20th bits of a conventional DIS (Digital Identification Signal) from the receiving station. For example, if the 19th bit is "0", the receiving station uses cut sheets of A4 size. If the 19th bit is "1", the receiving station uses cut sheets of B4 size. And if both the 19th and 10th bits are "1", it can be discriminated that a roll sheet is used at the receiving station.

In a step S72, in the case where the roll sheet is used at the receiving station, the control circuit 44 outputs the signal whose level "0" to the sending station identification forming circuit 40 to designate not to output the count value of the suffix counter 38 as the sending station identification information.

In step S74, the rest of the pre-message procedure proceeds. Then the message of image data is transmitted to the receiving station in step S76, and a post message procedure proceeded in step S78. Thus the transmission of image data to the receiving station which has a roll sheet as recording material is terminated.

On the other hand, if the control circuit 44 discriminates that the receiving station uses cut sheets in step S70, the control circuit 44 outputs the signal whose level is "1" to the forming circuit 40 to order to use the count value of the suffix counter 38 (S80).

The control circuit 44 discriminates whether transmission in the error correction mode is selected or not in step S82. If the error correction mode is not selected, the rest of the pre-message procedure proceeds in step S138.

The operation of this facsimile apparatus is described below when the error correction mode is selected and the receiving station reproduces the sent image data on the cut sheets.

The forming circuit 40 forms the sending station identification and writes this information into the memory circuit 12 to send this information as image data (S85). This information includes not only the sending station telephone number and the number of the original sheet but also the count value of the suffix counter 38.

The control circuit 44 orders the reading circuit 8 to read the original document line by line in step S86. In step S87, it is discriminated whether the reading of one main scanning line is finished. Every time the reading of one line is finished, the line counter's count value is incremented in step S88.

In step S90, the read image data is coded by the coding circuit 10 and framed to suit the HDLC format by the framing circuit 14.

The control circuit 44 discriminates whether the count value of the line counter has reached a predetermined line number corresponding to a size of the cut sheets at the receiving station in step S92. The line number corresponding to the cut sheets depends on the size of the cut sheets, e.g., A4 or B4, and the line density of transmission, e.g., fine density mode (7.7 lines/mm) or standard density mode (3.85 lines/mm). Therefore, the predetermined line number of one cut sheet can be determined in accordance with the size of the cut sheets and the line density of transmission during the premessage procedure. The predetermined line number is used for determining the separating position of the cut sheets at the receiving station.

The control circuit 44 writes RTC (Return to Control) which is used for making the receiving station able to respond to the protocol signals on the memory circuit 12 when the count value of the line counter coincides with the predetermined line number, i.e., the reading circuit 8 reads the image data corresponding to the amount of one cut sheet (S94).

The coded and HDLC framed data is sequentially transmitted, byte by byte and frame by frame with an interrupt procedure in parallel with above mentioned reading and coding procedures (S96). Then the control circuit 44 discriminates whether the frame including the Return to Control signal RTC is transmitted or not in step S98. If the transmission of RTC is finished, the return to control for a partial page signal RCP is transmitted three times (S100).

After 75 ms elapses (S102), the control circuit 44 processes the post-message procedure (S104). In the post-message procedure, the transmitting station sends the signal PPS-Q representing the termination of the partial page (PPS means the Partial Page Signal, and Q means the multi-page signal MPS showing that a succeeding page exists and that there is no mode change), the end of message signal EOM showing that succeeding page exists and that there is some mode change, or the end of procedure signal EOP showing that there is no succeeding page. The signal PPS-Q has the FIF (Facsimile Information Field) having the page number column set to the page number. In the page number column of this embodiment, the count value minus "1" of the actual receiving page counter 42 is set.

Thus, each partial page which is sent in the error correction mode is administrated by the serial page number which starts from "0". Therefore, the receiving apparatus clearly recognizes each partial page without twice setting same partial page number in the page number column, even if the image data of the longer original is sent to the receiving station which has only cut sheets as recording material. Thereby the image data is smoothly transmitted from the sending station to the receiving station which has only cut sheets, not a roll sheet.

Further, in the post-message procedure, if error occurs in some frames, the retransmission is prosecuted with the error correction procedure. On receiving the message confirmation signal MCF representing that all data of partial page is received correctly, the control circuit 44 advances to a next procedure (S105). If the signal MCF is not received for a while, the control circuit 44 terminates the transmission as an error (S106).

Thus, the transmission of image data corresponding to the amount of one cut sheet of the receiving station is terminated, and the count value of the suffix counter 38 and the count value of the actual receiving page counter 42 are incremented in steps S107 and S108. The count value of the actual sending page counter 36 is maintained, because the transmission of all image data of one actual sending sheet is not finished.

The count value of the line counter is reset to "0" in step S110.

Then the procedure controlled by the control circuit 44 is returned to step S85, and the control circuit 44 repeats the above-mentioned procedures until the reading operation of one actual original page is terminated.

In the last separated receiving cut sheet among a plurality of cut sheets corresponding to one actual original page, there is some image information. Thus, before the count value of the line counter reaches the predetermined number in step S92, the reading operation of one actual sending page is terminated. In step S112, the termination of the reading operation of one actual original page is discriminated. If the reading operation is terminated, the return to control signal RTC is written into the memory circuit 12 in step S114. The image data is transmitted until the frame including the signal RTC is transmitted in steps S116 and S118.

After the frame including the signal RTC is transmitted, the return to control signal of partial page RCP is transmitted three times in step S120. After 75 ms elapses in step S122, the post-message procedure is prosecuted in step S124. In step S124, the number which is the count value of the actual receiving page counter 42 minus "1" is set in the page number column of the terminating signal of partial page PPS-Q as well as in step S104. In step S124, the retransmission is also prosecuted if there is some error in data transmission.

After the message confirmation signal MCF is received, the procedure is advanced to step S126. But, if not, the transmission is terminated as error (S106).

Thus, when the transmission of one sending page image data is finished, in S126 the actual sending page counter 36 is incremented. In step S128, the actual receiving page counter 42 is also incremented. The suffix counter 38 is reset to "1" in step S130, and the line counter is reset to "0" in step S132.

In this situation, the control circuit 44 discriminates whether the next original sheet exists or not in step S134. If the next original sheet does not exist, the control circuit 44 recognizes that all transmission is finished, and the procedure is returned to the first step S52.

If there is the next sheet, the control circuit 44 discriminates whether there are any mode changes, e.g. reproducing density or resolution, etc. If there is some mode change, the procedure is returned to step S84, and the pre-message procedures are repeated. On the other hand, if not the procedure is returned to step S85, and the control circuit 44 causes the reading circuit 8 to start reading the next original sheet.

Transmission in the error correction mode is processed as mentioned above.

Transmission without the error correction mode is prosecuted as follows.

If the control circuit 44 discriminates that the error correction mode is not selected, the procedure is advanced to step S138, where the rest of the pre-message procedure is prosecuted. In step S139, the sending station identification is written into the memory circuit 12. In S140 the original sheet is read by the reading circuit 8 line by line. In step S141, the control circuit 44 discriminates whether the reading operation of one scanning line is finished or not. Every time the reading operation of one scanning line is terminated, the line counter is incremented in step S142. Then, the image information read by the reading circuit 8 is sequentially coded in step S144.

In step S146, the control circuit 44 discriminates whether the count value of the line counter coincides with the predetermined line number corresponding to size of cut sheets at the receiving station. If there is coincidence, the return to control signal RTC is written into the memory circuit 12 in step S148.

In step S150, the coded image data is sequentially transmitted by an interrupt routine in parallel with the reading operation.

In step S152, the control circuit 44 discriminates whether the signal RTC is transmitted or not. If it is, after 75 ms elapses, the suffix counter is incremented (S156) and the line counter is reset to "0" (S158). Then an intermediate procedure, e.g., sending the multi page signal MPS and receiving the message confirmation signal MCF, is prosecuted in step S160, and the procedure is returned to step 139 to repeat the transmission of a partial page having the rest of the image data of the same original sheet.

If it is discriminated that the reading operation is finished before the count value of the line counter reaches the predetermined line number in step S162, the return to control signal RTC is written into the memory circuit 12 in step S164.

In step S166, the image data is transmitted in parallel with the reading operation.

In step S168, it is discriminated whether the return to control signal RTC is transmitted. If so, after 75 ms elapses (S170), the actual sending page counter 36 is incremented in step S172, the suffix counter 38 is reset to "1" in step S176, and the line counter is reset to "0" in step S176. Then the intermediate procedure is prosecuted in step S178.

In step S180, the control circuit 44 discriminates whether the next original sheet exists or not. If not, the control circuit 44 recognizes that all transmission has been finished, and the procedure is returned to the first step S52.

If there is a next original sheet, the control circuit 44 further discriminates whether there are any mode changes or not in step S182.

If so, the procedure is returned to step 138 and the pre-message procedure is prosecuted. On the other hand, if not, the procedure is returned to step 139, and the reading operation is started immediately.

As mentioned above, in this embodiment, in the case that the facsimile apparatus sends the image data of long original sheets to the destination apparatus which has only cut sheets, the number of the actual sending page and the suffix number showing the separated output sheet are recorded on the receiving cut sheet as the identification information at the destination apparatus. Therefore, the destination station correctly administrates the page number of received cut sheets, so that the number of sending original sheets can be recognized at both sending and receiving stations in the case of discussion after transmission. The discussion will be smoothly prosecuted without discrepancy.

In the first embodiment mentioned-above, the amount of image data corresponding to one cut sheet of receiving apparatus is assumed not to exceed the maximum size of one block. However, this invention can be applied in the case where the amount of image data corresponding to one cut sheet of the receiving apparatus exceeds the maximum size of one block.

An explanation of another embodiment which enables the above-mentioned case is described as follows.

Figure 3:
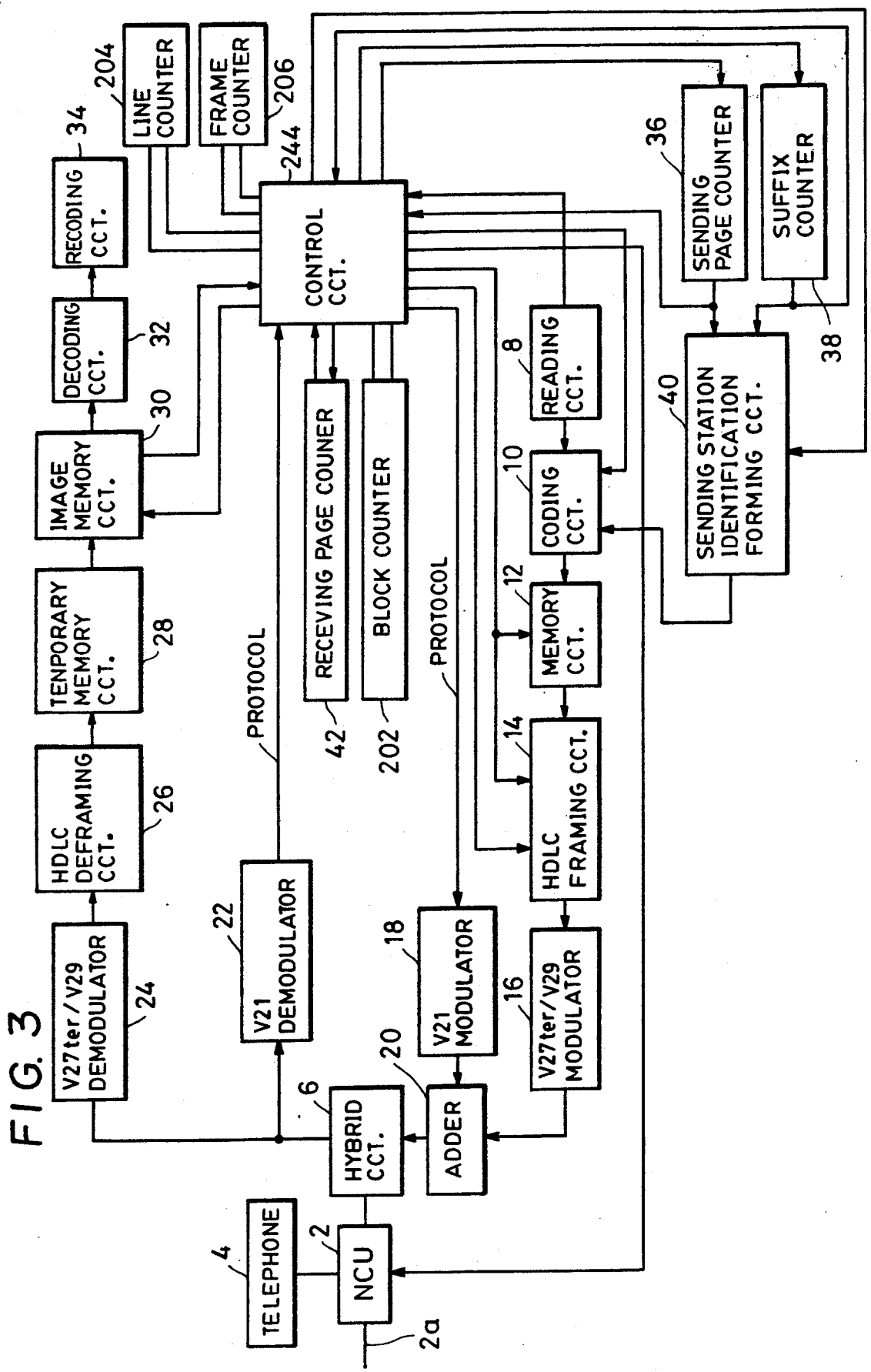
FIG. 3 is a block diagram showing another facsimile apparatus in a second embodiment of the present invention.

FIG. 3 shows a block diagram of a facsimile apparatus in the second embodiment. In FIG. 3, the circuits which have same functions as in FIG. 1 are identified with the same numbers, and explanations thereof are omitted.

The facsimile apparatus of FIG. 3 further includes a block counter 202 which counts the number of blocks to be transmitted in one transmission. The amount of image data corresponding to one cut sheet of the receiving apparatus might be a plurality of blocks, which is different from the first embodiment. The block counter 202 is incremented every one block/one partial page.

A line counter 204 is provided for counting scanning lines to be read. The line counter 204 is incremented every time the reading circuit 8 reads one scanning line.

A frame counter 206 is provided for counting numbers of frames, and is incremented every time the HDLC framing circuit 14 makes each frame with coded image data.

A control circuit 244 is provided for controlling all circuits in the facsimile apparatus and its system similarly as in the first embodiment. In this embodiment, the maximum for one block is structured with 256 frames, and one frame has 256 bytes of image data. Therefore, the amount of image data would be 256×256 bytes at most.

Figure 4:
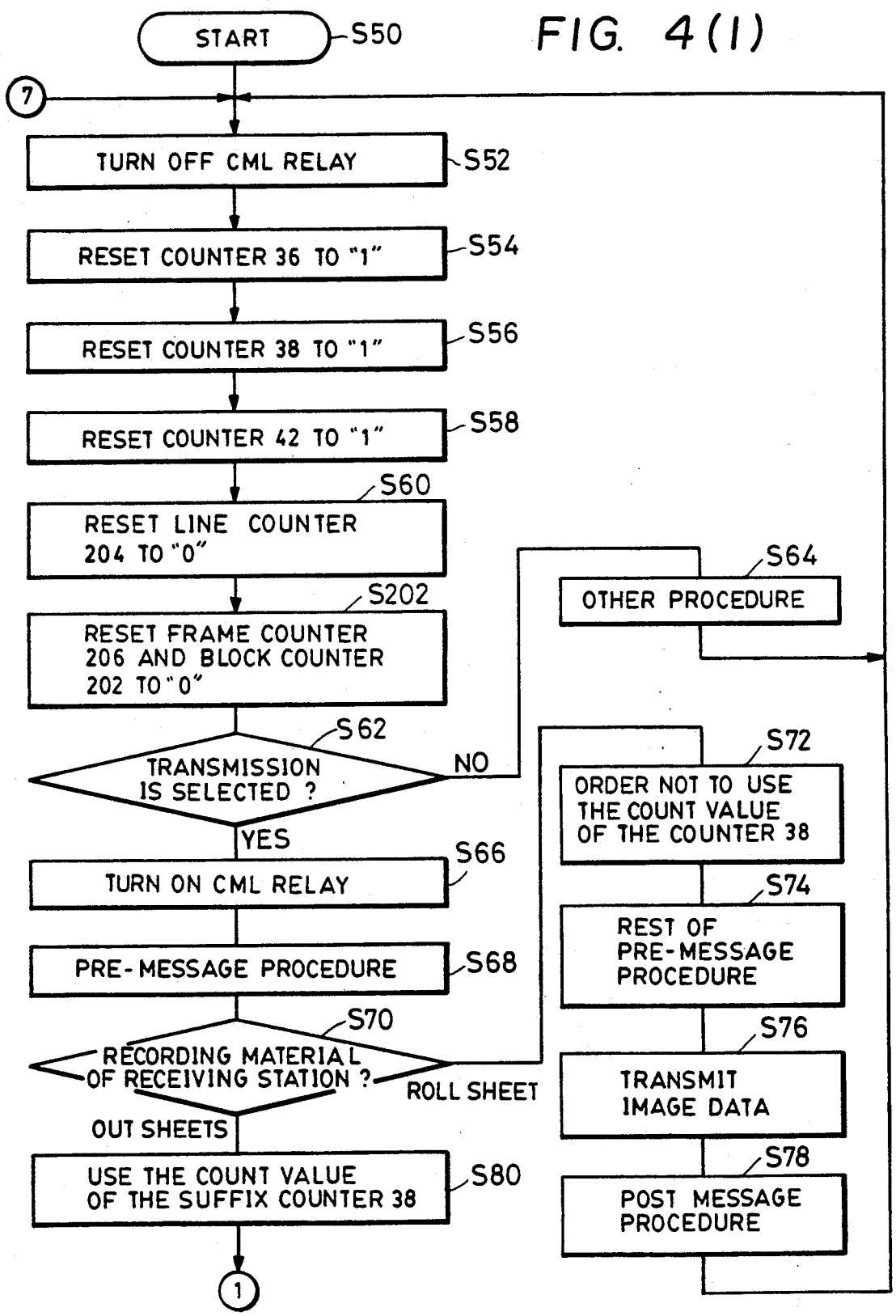
FIG. 4(1) through 4(5) are flow charts illustrating control operations of a control circuit in FIG. 3, and FIG. 5(A) and 5(B) are time charts showing communication procedures in an error correction mode.
Figure 4:
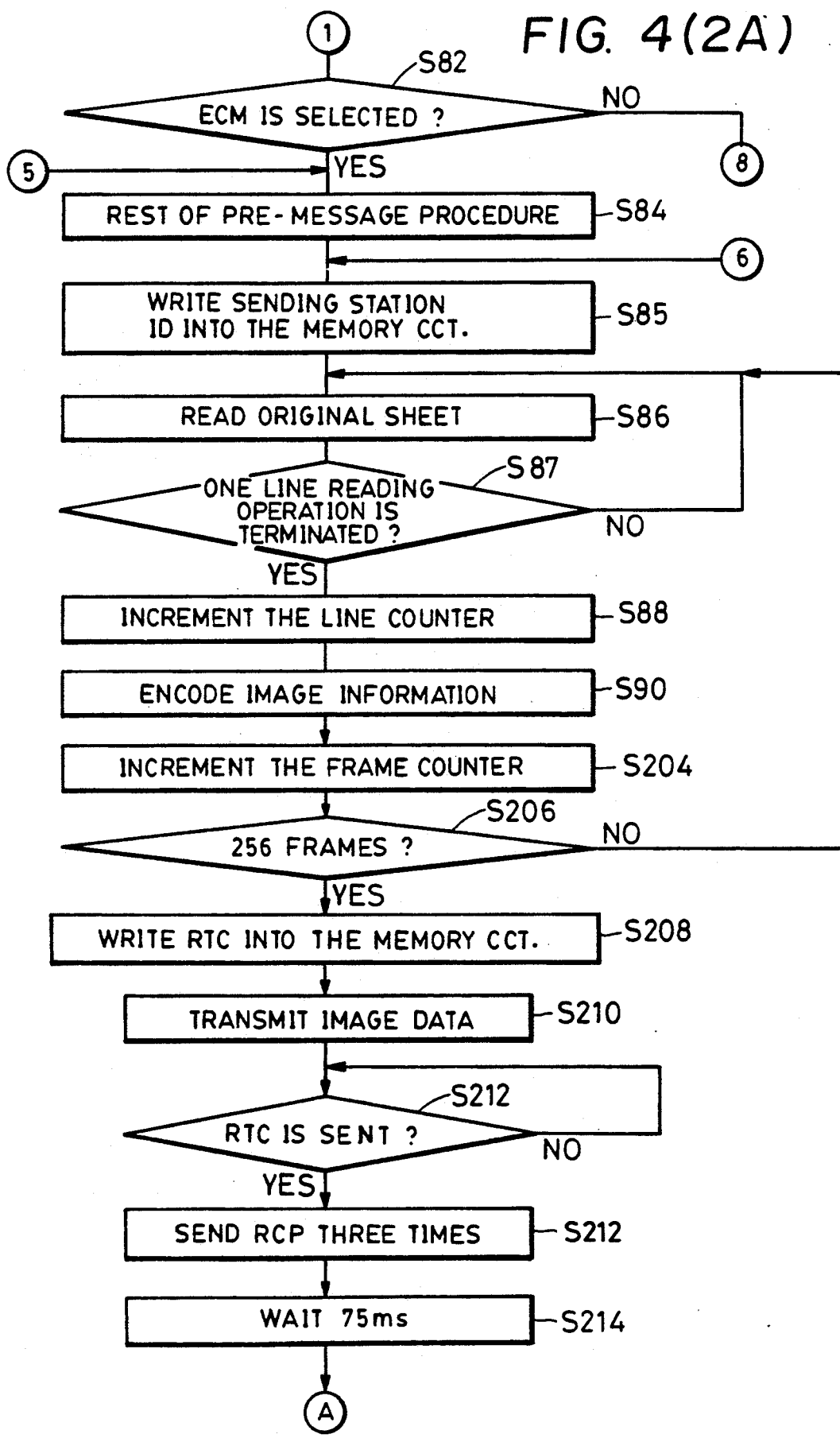

FIG. 4(1) through 4(5) are flow charts showing control operation of the control circuit 244.

In FIG. 4, the steps which are labelled with the same numbers as in FIG. 2 carry out same operations as in the first embodiment.

The explanation of the control operation of the control circuit 244 is as follows.

In the initialization of the control circuit 244, in step S202 the frame counter 206 and the block counter 202 are reset to "0" in addition to operations in steps S52 through S60.

In the case that the receiving apparatus has a roll sheet and the case that the error correction mode is not selected, the operation of the facsimile apparatus are the same as in the first embodiment, so that explanations of these operations are omitted.

The operation when the receiving apparatus has only cut sheets and the error correction mode is selected is explained as follows.

In this situation, after the sending station identification information is written into the memory circuit 12 in step S85, the reading operation of the original document, the coding operation of image information and the sending operation of image data are carried out in parallel. The line counter 204 is incremented every time a scanning line is read by the reading circuit, and the frame counter 206 is incremented every time each one frame of image data (256 bytes) is formed by the HDLC framing circuit 14.

When it is discriminated in step S206 that the number of frames reaches 256 before the count value of the line counter 204 reaches the predetermined line number corresponding to one cut sheet of the receiving apparatus, and before the reading circuit 8 finishes reading one sending original sheet, then the communication of protocol is started because the maximum block size which can be transmitted at once is 256 frames. In step S208, the return to control signal RTC is written into the memory circuit 12, and transmission is continued until the frame including the signal RTC is transmitted. And, in step S212 the return to control signal of partial page RCP is transmitted three times, and after 75 ms elapses in step S214 the post-message procedure is prosecuted in step S216. This boundary of transmission does not mean the boundary of the sending pages or the receiving pages, but rather a boundary of blocks or partial pages, so that the post-message command PPS-NULL is transmitted in this procedure. In the column of page counter of the command PPS-NULL the value which is the count value of the actual receiving page counter 42 minus "1" is set, and in a column of block counter of the command PPS-NULL the count value of the block counter 202 is set, and these values are transmitted to the receiving apparatus with the command PPS-NULL.

In this post-message procedure of step S216, if there occurred some error in transmission of image data, the retransmission of the image data is prosecuted in response to requirements from the receiving apparatus.

After the confirmation signal MCF from the receiving apparatus is received in step S218, the block counter 202 is incremented and the frame counter 206 is reset to "0" in step 220. Then the prosecution is returned to step S86, and the reading operation of the rest of the sending original sheet is continued.

In the next case, when it is discriminated in step S92 that the count value of the line counter 204 reaches the predetermined line count corresponding to one cut sheet of the receiving apparatus before the reading operation of one original sending sheet is terminated, then the procedure of steps S92 through S102, which is explained above, is carried out.

After this block of image data is transmitted, the post-message procedure of step S222 is carried out. This boundary of block means the boundary of receiving cut sheets, so that the post-message command PPS-MPS is ordinarily transmitted among PPS-Q. In the column of the page counter in the PPS-Q, the value which the count value of the actual receiving page counter 42 minus "1" is set, the value of the block counter 202 is set in the column of the block counter, and these values are transmitted to the receiving apparatus with the signal PPS-Q. In this situation, the retransmission may be carried out in response to a requirement from the receiving apparatus.

After the confirmation signal MCF from the receiving station is received in step S224, the block counter 202, the suffix counter 38, and the actual receiving page counter are incremented, and the line counter 204 and the frame counter 206 are reset to "0", because this boundary is the boundary of the blocks and the boundary of the actual receiving cut sheets. Then the procedure of the control circuit 244 is returned to step S85, and after the sending station identification information including the page number of sending original sheets and suffix page number showing original sheets and per one original sheet is written into the memory circuit 12, the reading operation of rest of original sheet is to be continued.

In the last case, when it is discriminated that the reading operation of one original sheet is terminated, the procedure of steps S114 through S122, which is explained in the first embodiment, is carried out.

This boundary means not only the boundary of the original sheets but also the boundary of blocks and the boundary of the receiving cut sheets. Thus, in the post-message procedure of step S228, as Q of the post message command PPS-Q, MPS, EOP, EOM or PRI (Procedure Interrupt Signal)-Q can be selected. A value which is the count value of the actual receiving counter 42 minus "1" is set in the column of the page counter and the count value of the block counter 202 is set in the column of the block counter of the signal PPS-Q. These values are transmitted to the receiving apparatus with the signal PPS-Q. In this post-message procedure, the retransmission of the erroneous frames might be carried out in response to a requirement from the receiving station similarly as in steps S216 and S222.

After it is discriminated that the confirmation signal MCF from the receiving apparatus is received in step S230, the block counter 202, the actual receiving page counter 42 and the actual sending page counter 36 are incremented, and the suffix counter 38, the line counter 204 and the frame counter 206 are reset in step S232. Then, if a next original sheet does not exist, the communication is terminated and the procedure is returned to the standby state shown by step S52.

If the next original sheet exists and there are any mode changes, the procedure is returned to step S84 to set new modes of communications.

If the next original sheet exists and there is no mode change, the procedure is returned to step S85, and after the sending station identification is written into the memory circuit 12, the reading operation of the next original sheet is restarted.

As described above, even if the amount of the image data corresponding to one cut sheet exceeds the maximum size of one block, the sending station as well as the receiving station can administer the number of the actual sending sheets and the number of the actual receiving sheets. Further, the receiving apparatus is able to recognize to which data received by the receiving apparatus the signal PPS-Q corresponds in accordance with the set values in the page counter and the block counter of the signal PPS-Q.

The present invention is not limited above-mentioned embodiments.

For example, the actual sending page number and the actual receiving page number might be recorded at the transmitting station and the receiving station as communication administrating information, or might be displayed on both displays of the transmitting station and the receiving station.

In this embodiment, the signal PPS-Q as the post-message command is explained, but similarly telephone calling may be requested by the operator at the sending station, wherein it is requested that the telephone line be connected to the telephone from the facsimile terminal. In such a case, the transmitting apparatus sends a signal PPS-PRI (Procedure Interrupt)-Q instead of the signal PPS-Q.

According to the present invention, the facsimile apparatus which sends original image data includes a counter counting the actual receiving pages at the receiving station. The number of actual receiving pages can be counted by the counter and sent to the receiving station, and so even if the transmitting apparatus sends image data of longer original sheets to the receiving station which has only cut sheets, the receiving station can recognize how many pages of cut sheets the sending station sends.

Although particular embodiments of the present invention are herein disclosed for purposes of explanation, various modifications thereof, after study of this specification, will be apparent to those skilled in the art to which the invention pertains.

WHAT IS CLAIMED IS:

1. A facsimile apparatus for sending image data to a receiving station adapted to reproduce received image data, said apparatus comprising:
    image data sending means for sending original image data in separate units in accordance with a size of receiving sheets at the receiving station on which the original image data is to be reproduced;
    receiving page counter means located at said sending facsimile apparatus for counting a number of the receiving sheets on which the original image data is reproduced at the receiving station and providing a count value; and
    receiving page data sending means for sending count data corresponding to said count value of said receiving page counter means.

2. A facsimile apparatus according to claim 1, wherein said receiving page counter means counts a number of the receiving sheets on which the original image data corresponding to one original sheet is reproduced.

3. A facsimile apparatus according to claim 2, wherein said receiving page data sending means sends data of the number of the receiving sheets corresponding to one original sheet as image data for every receiving page.

4. A facsimile apparatus according to claim 1, wherein said receiving page counter means counts a number of the receiving sheets on which the original image data is reproduced during one communication period.

5. A facsimile apparatus according to claim 4, wherein said facsimile apparatus has a retransmission function to retransmit the original image data in response to a requirement from the receiving station, and administrates the retransmission function in accordance with the number of the receiving sheets counted by the said receiving page counter means.

6. A facsimile apparatus according to claim 1, further comprising original page counter means for counting a number of sending original sheets.

7. A facsimile apparatus according to claim 6, further comprising original page data sending means for sending count data corresponding to a count value of said original page counter means.

8. A facsimile communication method comprising steps of: transmitting original image data of original sheets separately according to a size of cut sheets at a receiving station;
    transmitting original image data separately according to each end of each original sheet;
    sending a different identification code for every separated original image data therewith;
    receiving a retransmission request based on the different identification codes; and
    retransmitting the original image data in response to the retransmission request.

9. A facsimile communication method according to claim 8, further comprising a step of transmitting the original image data separately according to amount of image data, wherein in the code sending step the different identification code is attached every separated original data.

10. A facsimile communication method according to claim 9, wherein the identification code includes data regarding a number of cut sheets and a number of the separated original image data.

11. A facsimile transmitting apparatus comprising:
transmitting means for transmitting image data of original sheets to a receiving station;
sending page counter means located at said facsimile transmitting apparatus for counting a number of original sheets; and
receiving page counter means for counting a number of output pages which are reproduced at the receiving station.

12. A facsimile transmitting apparatus according to claim 11, wherein said receiving page counter means counts the number of the output pages corresponding to one original sheet.

13. A facsimile transmitting apparatus according to claim 12, further comprising means for sending data corresponding to a count value of said sending page counter means and a count value of said receiving page counter means as image data for each said output page.

14. A facsimile transmitting apparatus according to claim 13, wherein the image data corresponding to both said count values is set with the image data of the original sheet such that it is recorded on each output page as sending station identification.

15. A facsimile transmitting apparatus according to claim 11, wherein said transmitting means transmits the image data of original sheets separately in accordance with a size of the output pages.

* * * * *

UNITED STATES PATENT AND TRADEMARK OFFICE
CERTIFICATE OF CORRECTION

PATENT NO.  : 5,075,783
DATED       : December 24, 1991
INVENTOR(S) : TAKEHIRO YOSHIDA, ET AL.

It is certified that error appears in the above-identified patent and that said Letters Patent is hereby corrected as shown below:

Title page,
IN [56] REFERENCES CITED

U.S. PATENT DOCUMENTS, "Ysohimoto et al." should read --Yoshimoto et al.--.

COLUMN 4

Line 11, "actual" should read --of actual--.
Line 27, "received" should read --receiving--.

COLUMN 7

Line 34, "10th bits" should read --20th bits--.

COLUMN 15

Line 5, "attached" should read --attached to--.

Signed and Sealed this

First Day of June, 1993

Attest:

MICHAEL K. KIRK

Attesting Officer

Acting Commissioner of Patents and Trademarks